US009068708B2

(12) United States Patent
Antilla et al.

(10) Patent No.: US 9,068,708 B2
(45) Date of Patent: Jun. 30, 2015

(54) ILLUMINABLE VEHICLE BEVERAGE HOLDER ASSEMBLY

(71) Applicant: Ford Global Technologies, LLC, Dearborn, MI (US)

(72) Inventors: Steven J. Antilla, Brighton, MI (US); Inshirah Hillawi, Canton, MI (US); Megan May Lovejoy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 13/909,341

(22) Filed: Jun. 4, 2013

(65) Prior Publication Data

US 2014/0355252 A1 Dec. 4, 2014

(51) Int. Cl.
*F21V 33/00* (2006.01)
*F21S 8/10* (2006.01)
*B60N 3/10* (2006.01)
*B60Q 3/02* (2006.01)

(52) U.S. Cl.
CPC . *F21S 48/00* (2013.01); *B60N 3/10* (2013.01); *B60Q 3/0243* (2013.01); *B60N 3/101* (2013.01); *B60N 3/108* (2013.01)

(58) Field of Classification Search
CPC ............... B60Q 3/0243; B60Q 3/004; B60N 3/105–3/108; B60N 3/101
USPC ................ 362/543–549, 154, 488; 248/311.2
See application file for complete search history.

(56) References Cited

U.S. PATENT DOCUMENTS

| 6,234,439 | B1 | 5/2001 | Townsend et al. |
| 6,637,709 | B1 * | 10/2003 | Guenther et al. .......... 248/311.2 |
| 6,896,387 | B2 | 5/2005 | Renfro |
| 2006/0097121 | A1 | 5/2006 | Fugate |
| 2008/0028647 | A1 * | 2/2008 | Fratianne ......................... 40/324 |
| 2008/0266853 | A1 * | 10/2008 | Goto ............................. 362/240 |
| 2011/0037287 | A1 * | 2/2011 | Penner ......................... 296/37.8 |
| 2011/0235354 | A1 | 9/2011 | Glazier |
| 2011/0273865 | A1 | 11/2011 | Robbins |
| 2011/0297715 | A1 * | 12/2011 | Kamiya et al. ................ 224/539 |
| 2012/0075842 | A1 * | 3/2012 | Goto ............................. 362/154 |
| 2014/0104817 | A1 * | 4/2014 | Foo ............................... 362/154 |

FOREIGN PATENT DOCUMENTS

JP         2002144965 A  *  5/2002

\* cited by examiner

*Primary Examiner* — Mariceli Santiago
(74) *Attorney, Agent, or Firm* — Vichit Chea; Price Heneveld LLP (57) ABSTRACT

An illuminable beverage holder assembly is provided and includes at least one side wall coupled an illuminable base member to form a receptacle for receiving a beverage container. The illuminable base member includes a distal engagement member with an optical surface. A light source is operably coupled to the engagement member and configured to emit light through the optical surface to illuminate the illuminable portion.

17 Claims, 10 Drawing Sheets

ILLUMINABLE VEHICLE BEVERAGE HOLDER ASSEMBLY

FIELD OF THE INVENTION

The present invention generally relates to illuminable beverage holders and more specifically to illuminable beverage holders adapted for use in a vehicle.

BACKGROUND OF THE INVENTION

The utilization of illuminable beverage holders for vehicle use is well known in the prior art and typically involves using a light source to illuminate a receptacle in which a beverage may be received so that a vehicle occupant can easily find the beverage during dark conditions in addition to providing ambient light. Some setbacks associated with existing illuminable beverage holders include positioning the light source in a manner that is distracting to vehicle occupants and complicated construction. Therefore, there is a need for an illuminable beverage holder that does not suffer from these setbacks.

SUMMARY OF THE INVENTION

According to one aspect of the present invention, an illuminable beverage holder assembly is provided and includes a receptacle for receiving a beverage container, the receptacle being formed by at least one side wall coupled to an illuminable base member having a distal engagement member with an optical surface, and a light source operably coupled to the engagement member and configured to emit light through the optical surface to illuminate the illuminable portion.

According to another aspect of the present invention, an illuminable beverage holder assembly is provided and includes a receptacle for receiving a beverage container, the receptacle being formed by at least one side wall coupled to an illuminable base member having a distal engagement member with an optical surface, and a circuit board coupled to the engagement member and having a light source positioned to emit light through the optical surface to illuminate the illuminable portion.

According to another aspect of the present invention, an illuminable beverage holder assembly is provided and includes a receptacle for receiving a beverage container, the receptacle being formed by at least one side wall coupled to an illuminable base member that is partially covered by a mat and has a distal engagement member with an optical surface, and a circuit board coupled to the engagement member and having a light source positioned to emit light through the optical surface to illuminate the illuminable portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
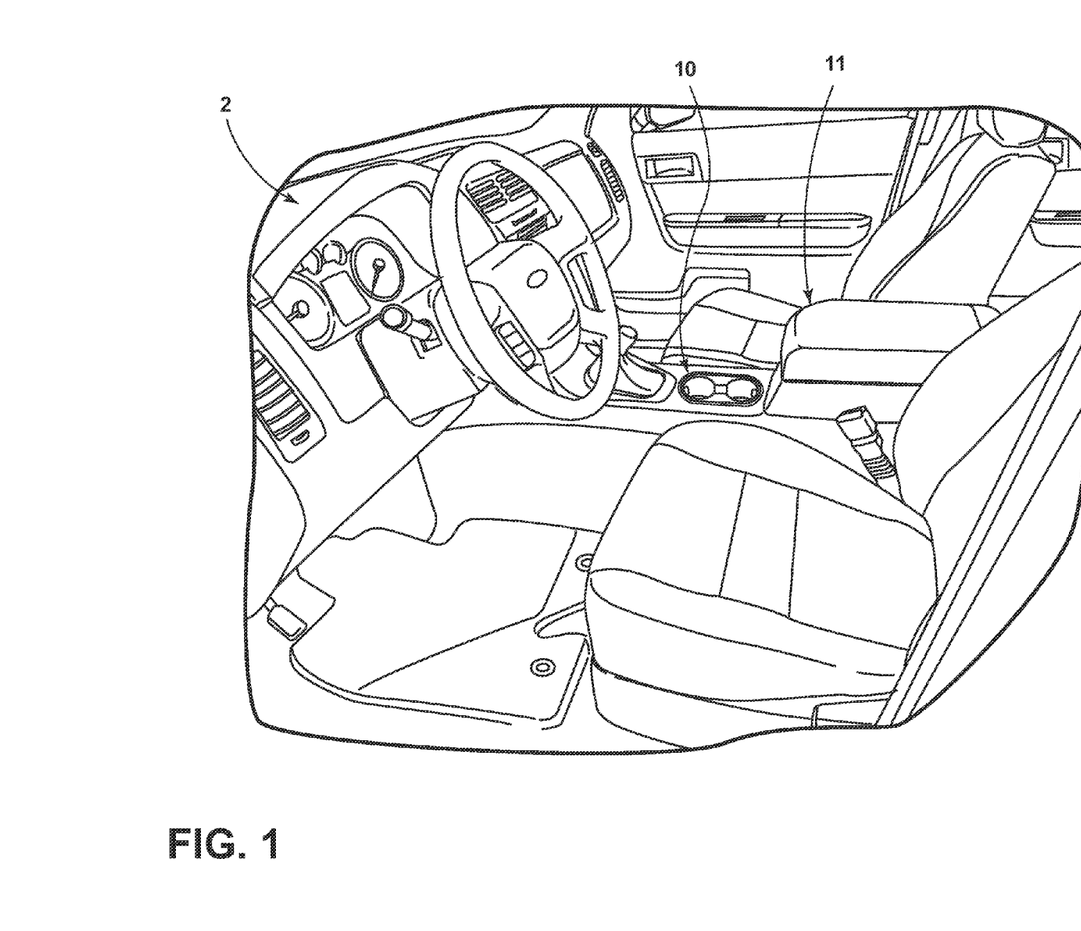
FIG. 1 is a side perspective view of a vehicle interior in which an illuminable beverage holder assembly is generally shown incorporated in a center console area.

Referring to FIG. 1, an illuminable beverage holder assembly 10 is generally shown incorporated in a center console 11 located within a vehicle 2. As will be described below in greater detail, the illuminable beverage holder assembly 10 is configured to hold one or more beverage containers and to illuminate to provide ambient lighting, which may serve as a mood enhancer and/or assist a vehicle occupant in locating a beverage container during dark conditions.

Figure 2:
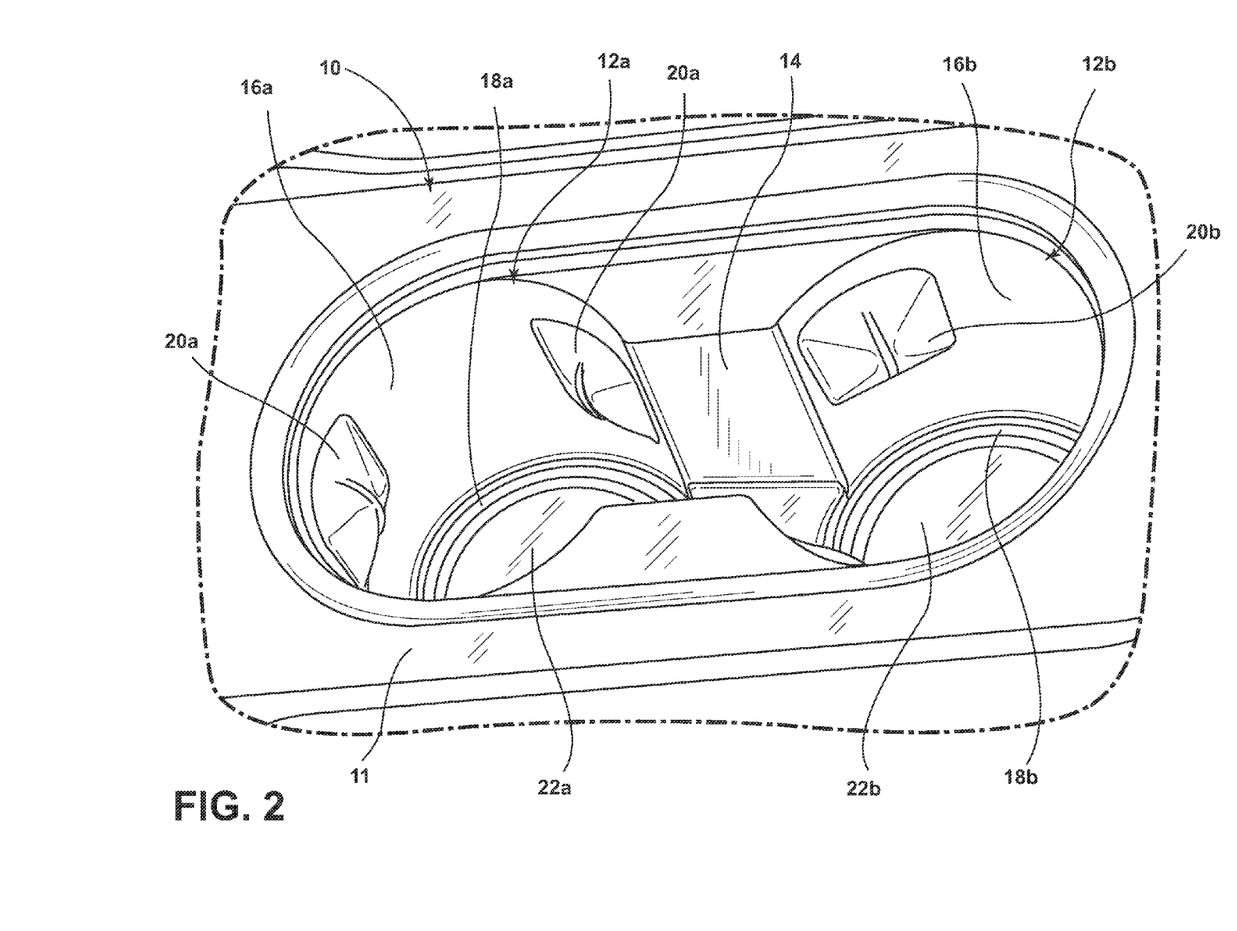
FIG. 2 is a top perspective view showing one embodiment of the illuminable beverage holder assembly having two receptacles that are each formed by an illuminable member and at least one side wall.
Figure 3:
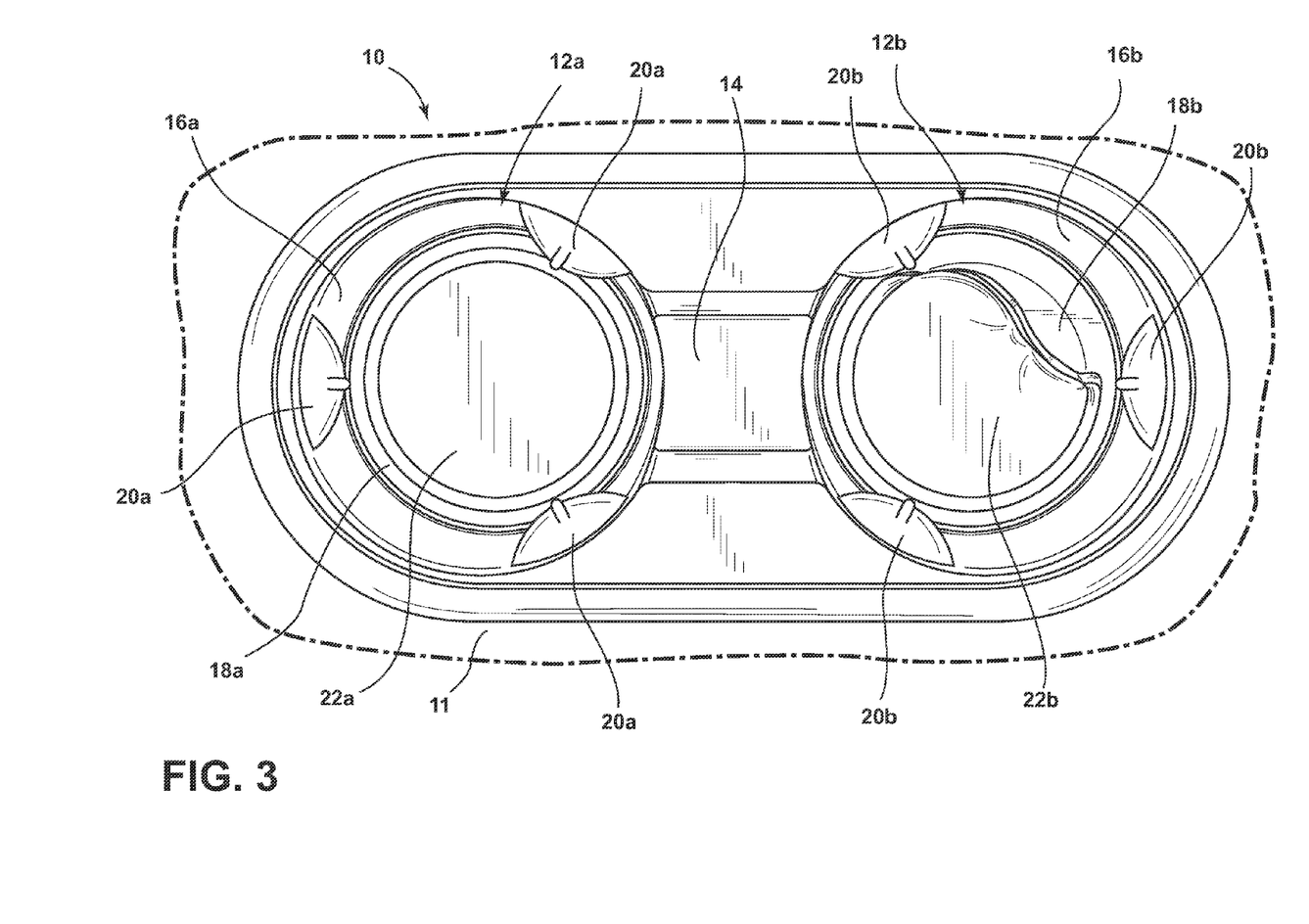
FIG. 3 is a top view of the illuminable beverage holder assembly shown in FIG. 1.

Referring to FIGS. 2 and 3, one embodiment of an illuminable beverage holder assembly 10 for use in a vehicle is shown having two receptacles 12a, 12b and a recessed channel 14 for connecting receptacles 12a and 12b. While the illuminable beverage holder assembly 10 is exemplarily shown incorporated in the center console 11 of the vehicle 2, it is understood that the illuminable beverage holder assembly 10 may be adapted to a variety of vehicle structures located throughout the vehicle 2. Moreover, while the illuminable beverage holder assembly 10 is shown in FIG. 2 and FIG. 3 as having two receptacles 12a, 12b, it is understood that a different number of receptacles may be used such as a single receptacle or more than two receptacles. It is also understood that while the receptacles 12a, 12b are shown connected via the recessed channel 14 in the embodiment shown in FIGS. 2 and 3, the receptacles 12a, 12b may be disposed in an unconnected configuration as well.

As shown in FIGS. 2 and 3, receptacles 12a and 12b are each formed by at least one side wall 16a, 16b coupled to a corresponding illuminable base member 18a, 18b. According to one embodiment, the side walls 16a, 16b are constructed from a rigid material such as plastic and are disposed in a cylindrical configuration. However, other common one-sided configurations may be used such as truncated conical in addition to multi-sided configurations according to other embodiments.

In the embodiment shown in FIGS. 2 and 3, each of the side walls 16a, 16b may include a plurality of nippled retaining members 20a, 20b typically constructed from a polymeric material such as rubber and formed into each respective side wall 16a, 16b. The retaining members 20a, 20b are typically positioned inside the corresponding receptacle 12a, 12b and circumferentially spaced around the corresponding side wall 16a, 16b. In this configuration, the retaining members 20a, 20b function to frictionally engage the side(s) of a beverage container that has been received in the corresponding receptacle 12a, 12b to prevent the beverage container from becoming dislodged.

As further shown in FIGS. 2 and 3, each receptacle 12a, 12b may include a mat 22a, 22b positioned to partially cover illuminable base members 18a and 18b, respectively. The mats 22a, 22b are typically constructed from a polymeric material such as rubber and may serve to protect the illuminable base members 18a, 18b and/or frictionally engage the bottom of the beverage container. In the present embodiment, the mats 22a, 22b are cylindrically shaped having opaque characteristics and are concentrically aligned with the corresponding illuminable base members 18a, 18b such that the illuminable base members 18a, 18b are visible in an annular ring configuration. As shown in FIG. 3, mat 22b is in a partially lifted position wherein further lifting enables the mat 22b to be removed for cleaning or if a vehicle occupant desires for a greater portion of illuminable base member 18b to be visible. While not shown, mat 22a may be removed in a similar fashion.

Figure 4:
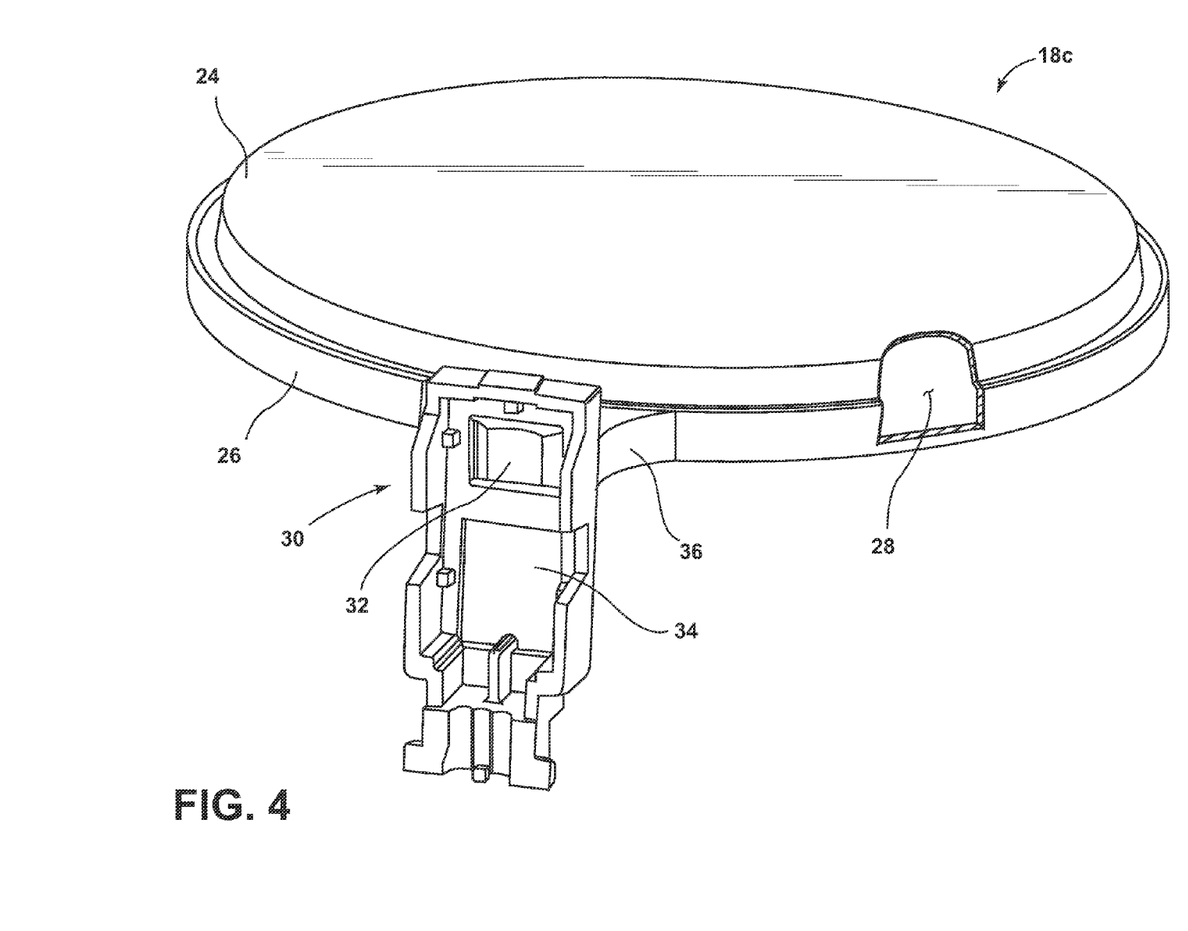
FIG. 4 is a side perspective view showing one embodiment of an illuminable member of the illuminable beverage holder assembly having first and second portions and a distal engagement member.

Referring to FIGS. 4-7, one embodiment of an illuminable base member 18c is shown. As shown in FIG. 4, the illuminable base member 18c is typically constructed from a rigid material having translucent or transparent properties such as acrylic and includes a first portion 24 and a second portion 26, together defining an interior space 28 that is capable of being illuminated. The first and second portions 24, 26 are shown having cylindrical configurations and are concentric with each other, the first portion 24 having a smaller radius than the second portion 26. The illuminable base member 18c also includes an engagement member 30 having an optical surface 32 and a mounting surface 34. As shown, the engagement member is connected to the second portion 26 via a connector 36 that is integrally formed to the second portion 26 and the optical surface 32.

Figure 5:
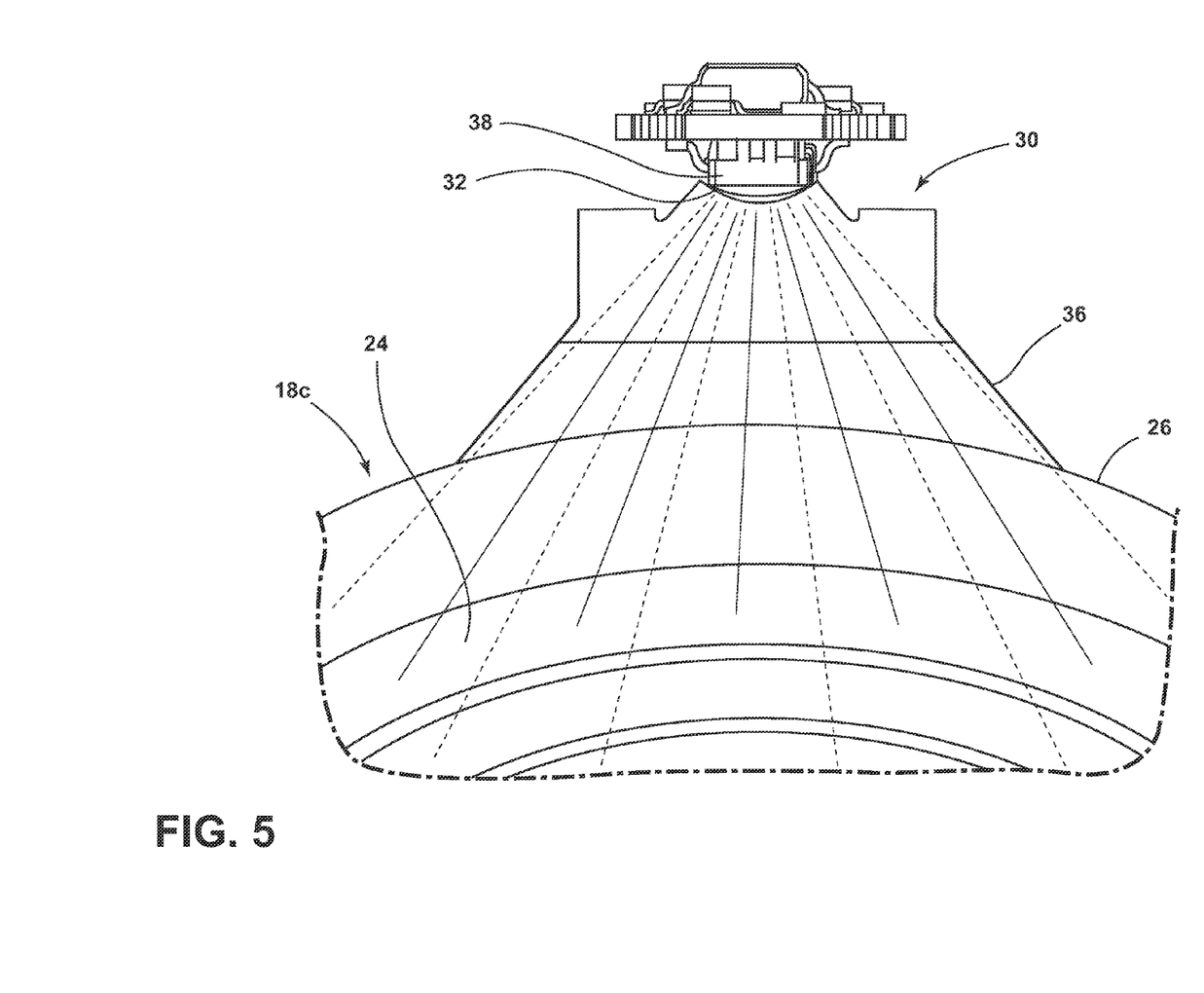
FIG. 5 is a partial top perspective view showing a light source emitting light through an optical surface of the engagement member to illuminate the illuminable member.

As shown in FIG. 5, a light source 38 is operably coupled to the engagement member 30 to emit light through the optical surface 32 to illuminate the illuminable base member 18c, which subsequently provides ambient lighting to the corresponding receptacle. In this manner, the light source 38 emits light in a direction transverse to the receptacle side wall(s). The light source 38 may include a light-emitting diode (LED) having a determinable beam output angle or spread. It should be appreciated that one or more LEDs or other light source(s) may be employed. To optimize the distribution of emitted light, the optical surface 32 is curved according to the beam spread to minimize refraction when emitted light passes through the optical surface 32 and the connector 36 is disposed to gradually widen as emitted light approaches the illuminable base member 18c to maximize the beam spread.

Figure 6:
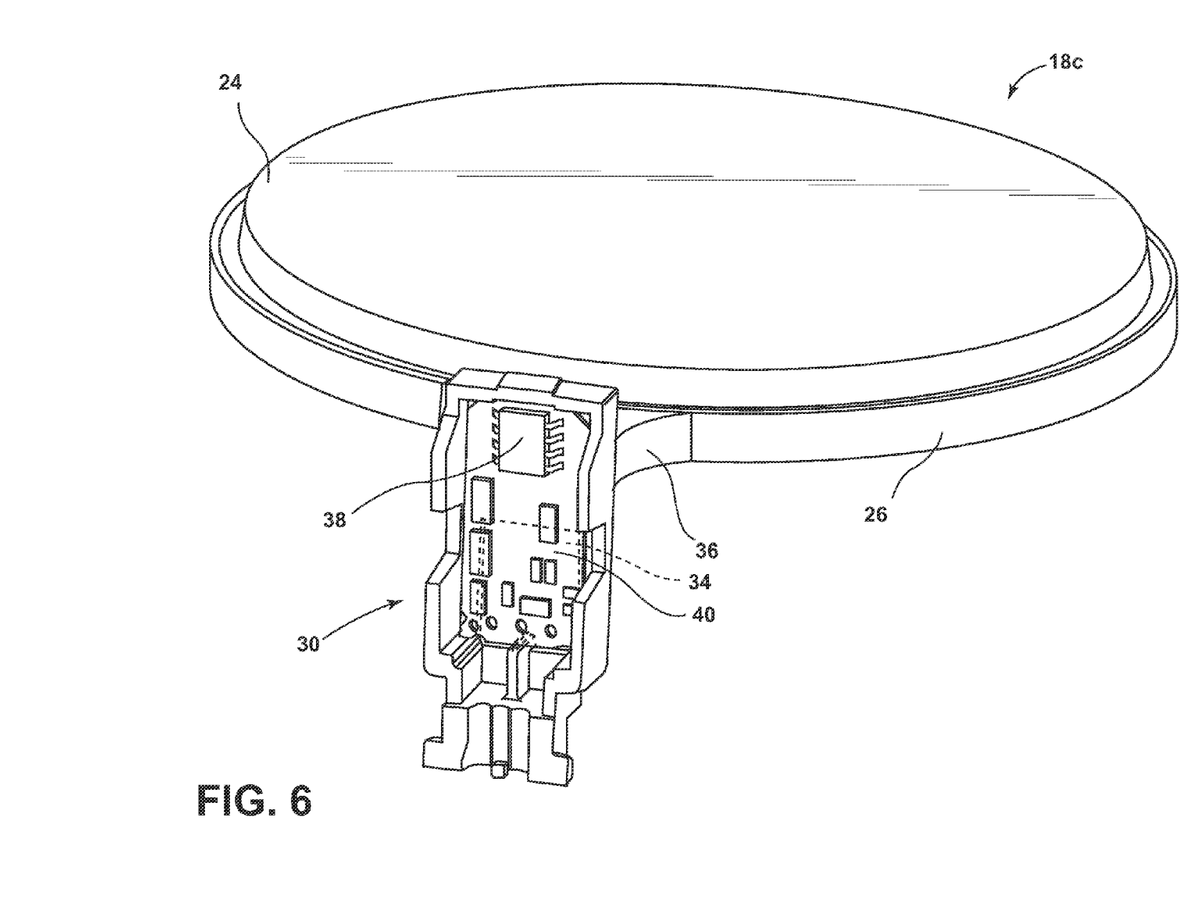
FIG. 6 is a side perspective view showing a circuit board mounted to the engagement member, wherein the light source is included on the circuit board.
Figure 7:
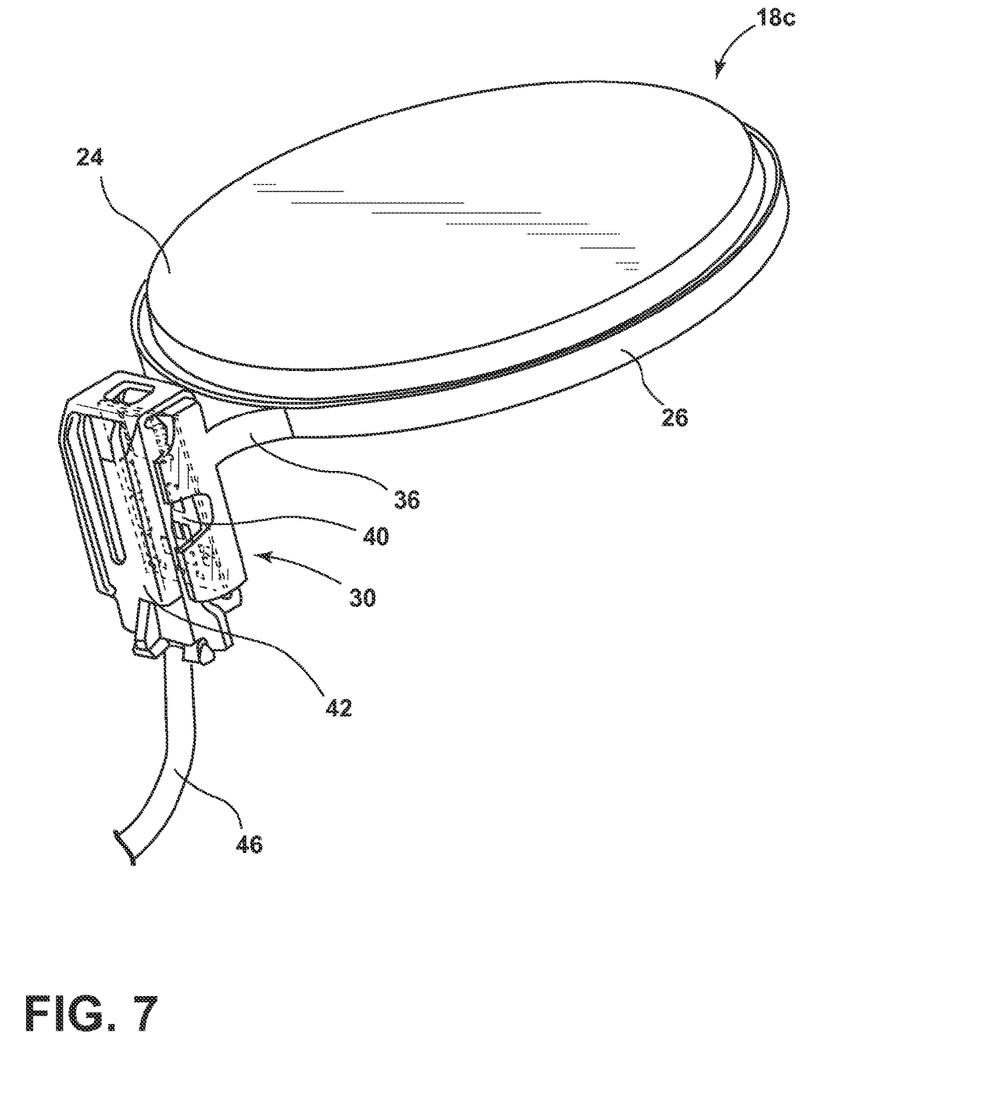
FIG. 7 is a side perspective view showing a back cover mounted to the engagement member to form a protective housing for the circuit board.

As shown in FIG. 6, the light source 38 is provided on a circuit board 40 mountable to the mounting surface 34 of the engagement member 30. In addition, circuit board 40 may have circuitry for driving the light source 38 and controlling the output characteristics of the light source 38 such as hue, duration, and/or intensity. As shown in FIG. 7, a back cover 42 is coupled to the engagement member 30 to further protect the circuit board 40 and light source 38 ensemble, which may receive electrical power from a vehicle power source via a wire connection 46 or other suitable means for power delivery.

Figure 8:
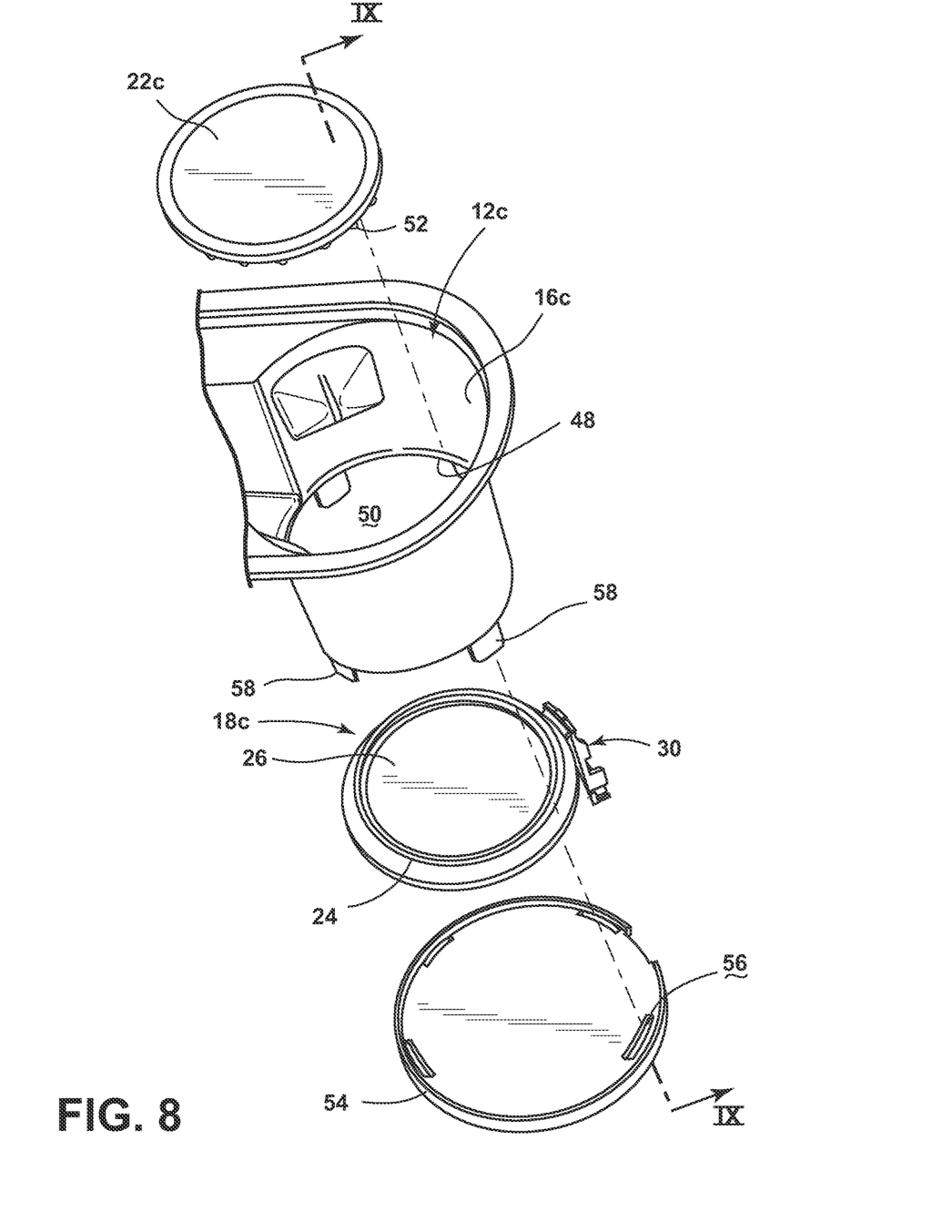
FIG. 8 is an exploded view of one embodiment of the illuminable beverage holder assembly showing a method of forming a receptacle.
Figure 9:
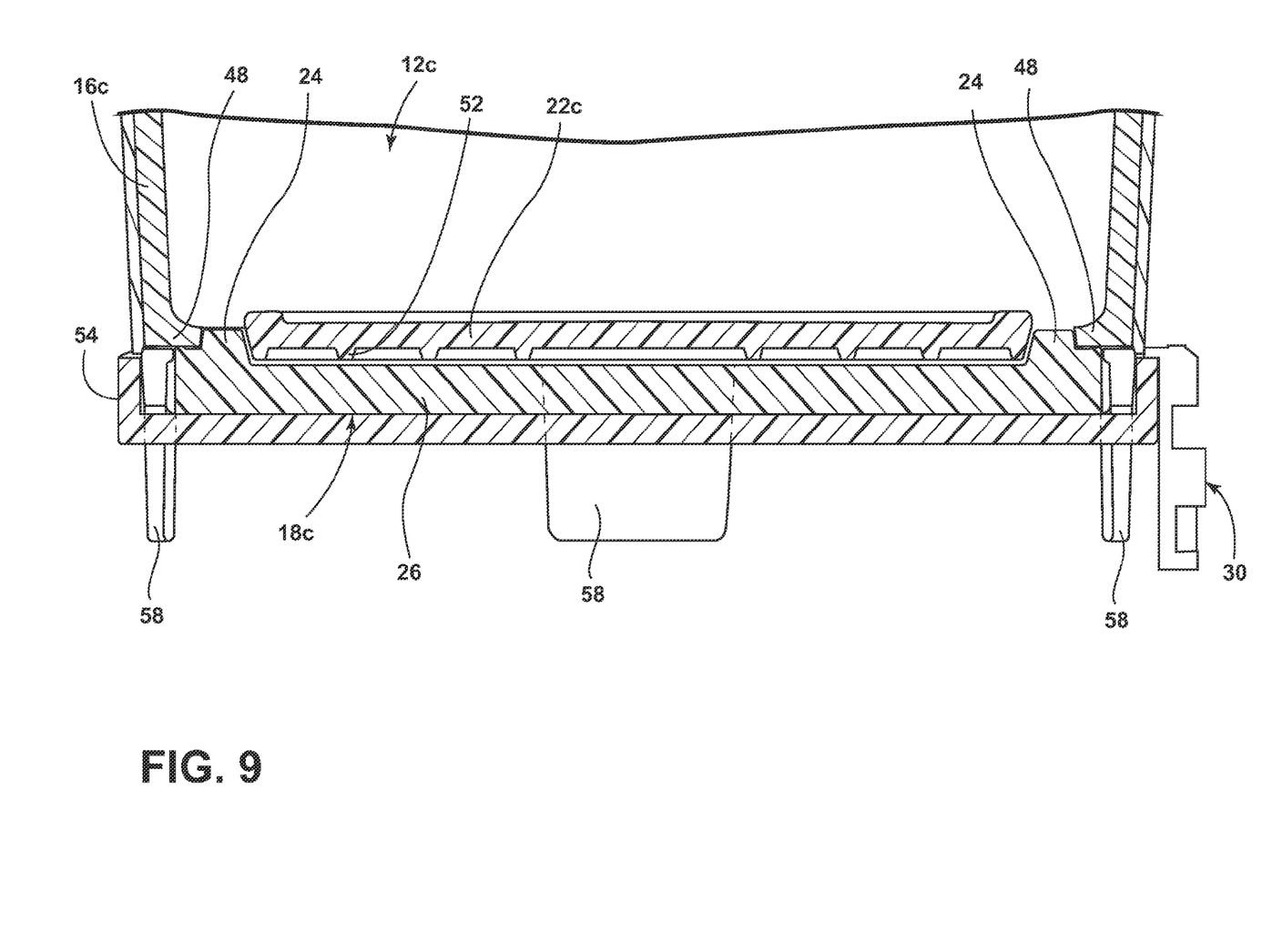
FIG. 9 is a cross-sectional view taken along lines VIII-VIII of FIG. 7 showing an assembled receptacle.
Figure 10:
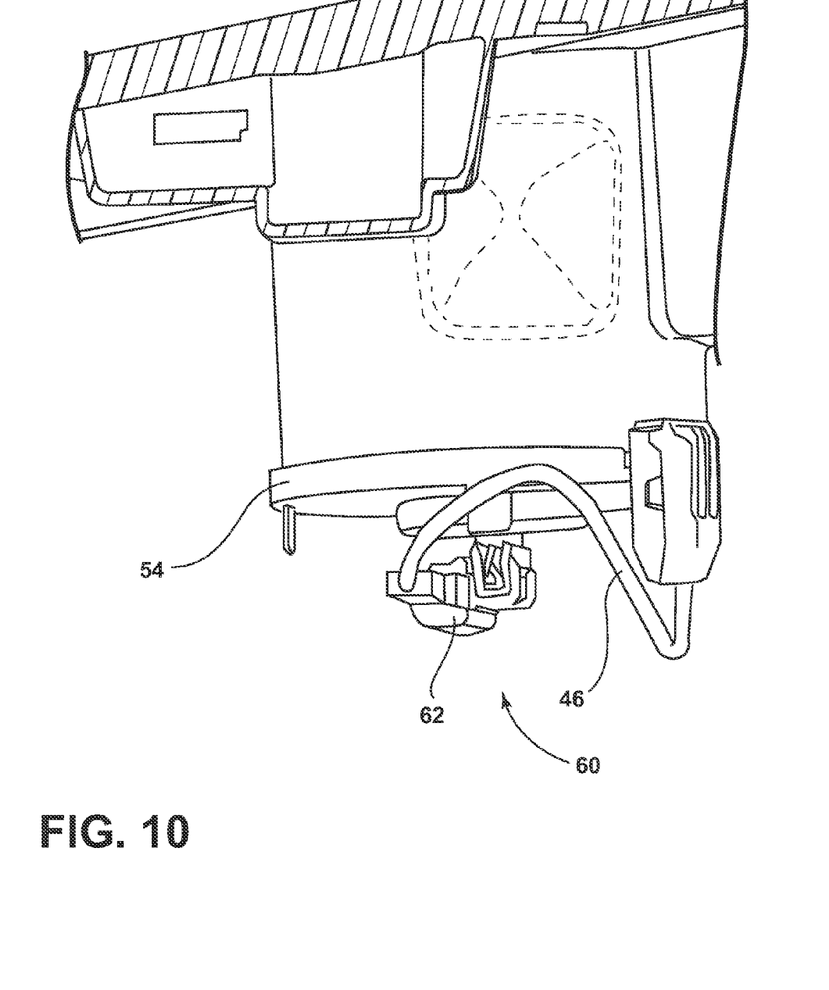
FIG. 10 is a side perspective view showing an assembled illuminable beverage holder assembly having a wire assembly, according to one embodiment.

Referring to FIGS. 8-10, one method for forming a receptacle 12c is shown using illuminable base member 18c and a side wall 16c having a cylindrical configuration. As shown in FIGS. 8 and 9, the second portion 26 of the illuminable base member 18c is engaged to an end 48 of the side wall 16c while the first portion 24 fits into an opening 50 formed at the end 48 of the side wall 16c, thereby allowing the first portion 24 to be visible within the receptacle 12c. For exemplary purposes, the first portion 24 is shown partially recessed to prevent mat 22c, from moving. Mat 22C is also shown partially recessed and may include textural features such as support ribs 52 that extend along the underside of the mat 22c.

The engagement between the second portion 26 and the end 48 prevents the illuminable base member 18c from moving into the receptacle 12c. To hold the illuminable base member 18c in place, a holding structure 54 is engaged to the underside of the second portion 26 and includes a plurality of distal apertures 56 configured to receive a plurality of inserts 58 spaced circumferentially on the end 48 of the receptacle 12c. The holding structure 54 and inserts 58 are typically constructed from a plastic material and the inserts 58 are joined to the corresponding apertures 56 via heat staking or other similar processes to secure the holding structure 54 to the side wall 16c. Once joined, the holding structure 54 encloses the first and second portions 24, 26 of the illuminable base member 18c while leaving the engagement member 30 exposed.

As shown in FIG. 10, a wire assembly 60 is exemplarily illustrated having a wire 46 connected to a wire connector 62 that is anchored to the underside of the holding structure 54. The wire connector 62 may be configured to make electrical connections with the power cables from the on board vehicle power source in addition to wires associated with other illuminable base members to power the illuminable beverage holder assembly. In this manner wires associated with the illuminable beverage holder assembly 10 can be easily located and serviced in the event one or more wires are malfunctioning.

Accordingly, an illuminable beverage holder assembly has been advantageously described herein. The illuminable beverage holder assembly benefits from an illuminable base member that is optimized for receiving light from a light source coupled thereto to illuminate a receptacle to provide ambient lighting and/or assist a vehicle occupant in locating a beverage container that has been received in the receptacle during dark conditions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illuminable vehicle beverage holder assembly, comprising:
   a receptacle for receiving a beverage container and having at least one side wall coupled to an illuminable base member having a distal engagement member with an optical surface and an annular portion that is visible within the receptacle; and
   a light source operably coupled to the engagement member and configured to emit light through the optical surface to illuminate the illuminable portion.

2. The illuminable vehicle beverage holder assembly of claim 1, wherein the at least one side wall comprises a plurality of retaining members positioned inside the receptacle and spaced around the at least one side wall for frictionally engaging the beverage.

3. The illuminable vehicle beverage holder assembly of claim 1, further comprising a mat having opaque characteristics and positioned within the receptacle to partially cover the illuminable portion.

4. The illuminable vehicle beverage holder assembly of claim 1, wherein the light source is provided on a circuit board and the circuit board is mounted to the engagement member.

5. The illuminable vehicle beverage holder assembly of claim 1, wherein the light source comprises a LED, wherein the LED has a determinable beam spread and the optical surface comprises a curved configuration to minimize refraction when the light emitted from the LED passes through the optical surface.

6. The illuminable vehicle beverage holder assembly of claim 5, wherein the illuminable base member and the optical surface are connected via a connector such that emitted light travels through the connector and enters the illuminable portion, wherein the connector gradually widens as emitted light approaches the illuminable base member to maximize the beam spread of the emitted light.

7. The illuminable vehicle beverage holder assembly of claim 1, further comprising a holding structure for holding the illuminable member in place with the at least one side wall, wherein the holding structure engages the underside of the illuminable member and includes a plurality of distally spaced apertures that receive a plurality of inserts disposed on an end of the at least one side wall, thereby securing the holding structure to the at least one side wall.

8. The illuminable vehicle beverage holder assembly of claim 1, wherein the receptacle comprises at least one receptacle and is formed in an interior vehicle structure.

9. An illuminable vehicle beverage holder assembly, comprising:
   a receptacle for receiving a beverage container and having at least one side wall coupled to an illuminable base member having a distal engagement member with an optical surface and an annular portion that is visible within the receptacle;
   a circuit board coupled to the engagement member; and
   a light source coupled to the circuit board to emit light through the optical surface to illuminate the illuminable portion.

10. The illuminable vehicle beverage holder assembly of claim 9, wherein the at least one side wall comprises a plurality of retaining members positioned interior to the receptacle and spaced around the at least one side wall for frictionally engaging the beverage.

11. The illuminable vehicle beverage holder assembly of claim 9, further comprising a mat having opaque characteristics that is positioned within the receptacle to partially cover the illuminable portion.

12. The illuminable vehicle beverage holder assembly of claim 9, wherein the light source comprises an LED, wherein the LED has a determinable beam spread and the optical surface comprises a curved configuration to minimize refraction when light emitted from the LED passes through the optical surface.

13. The illuminable vehicle beverage holder assembly of claim 12, wherein the illuminable base member and the optical surface are connected via a connector such that emitted light travels through the connector and enters the illuminable portion, wherein the connector gradually widens as emitted light approaches the illuminable base member to maximize the beam spread.

14. The illuminable vehicle beverage holder assembly of claim 9, further comprising a holding structure for holding the illuminable member in place with the at least one side wall, wherein the holding structure engages the underside of the illuminable member and includes a plurality of distally spaced apertures that receive a plurality of inserts disposed on an end of the at least one side wall, thereby securing the holding structure to the at least one side wall.

15. The illuminable vehicle beverage holder assembly of claim 9, wherein the receptacle comprises at least one receptacle and is formed in an interior vehicle structure.

16. An illuminable vehicle beverage holder assembly, comprising:
   a receptacle for receiving a beverage container and having at least one side wall coupled to an illuminable base member that is partially covered by a mat and has a distal engagement member with an optical surface and an annular portion that is visible within the receptacle; and
   a circuit board coupled to the engagement member and having a light source positioned to emit light through the optical surface to illuminate the illuminable portion.

17. The illuminable vehicle beverage holder assembly of claim 16, wherein the light source comprises an LED, wherein the LED has a determinable beam spread and the optical surface comprises a curved configuration to minimize refraction when light emitted from the LED passes through the optical surface.

* * * * *